Aug. 5, 1958 A. H. FOLEY 2,846,643

COMPENSATED ELECTRICAL INTEGRATOR

Filed June 1, 1956 2 Sheets-Sheet 1

Inventor
Albert H. Foley
by Gilbert P. Tarleton
His Attorney.

COMPENSATED ELECTRICAL INTEGRATOR

Filed June 1, 1956

Inventor
Albert H. Foley,
by Gilbert P. Tarleton
His Attorney.

United States Patent Office 2,846,643

Patented Aug. 5, 1958

2,846,643

COMPENSATED ELECTRICAL INTEGRATOR

Albert H. Foley, Pittsfield, Mass., assignor to General Electric Company, a corporation of New York Application June 1, 1956, Serial No. 588,925

12 Claims. (Cl. 323—122)

Figure 1:
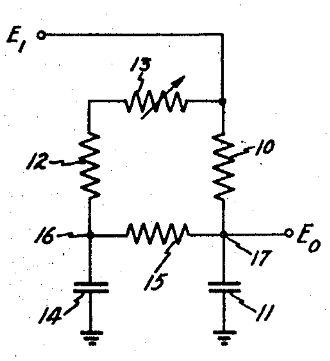

This invention relates to electrical circuits, and more in particular to an improved electrical integrating and phase shifting network.

This application is a continuation-in-part of my application Serial No. 504,935, filed April 29, 1955, now abandoned, and assigned to the assignee of the present application.

In the past a simple series resistance-capacitance circuit having an input signal applied across the series combination and an output taken across the capacitance has been frequently employed where integration of an electrical signal is desired, or where a source of quadrature voltage is required. It is well known, however, that this circuit cannot provide a pure quadrature voltage output. In terms of sinusoidal excitation, integration implies that the output voltage must lag the input voltage by 90 electrical degrees. Thus, the simple resistance-capacitance network does not provide accurate integration. For practical purposes, however, these functions are realized fairly well if the ratio of the resistance of the resistor to the reactance of the capacitor is exceptionally high, say 100 to 1 or more. As an example, suppose it is required to integrate an electrical signal and, at the same time provide a 90° phase shift with an error not to exceed three minutes at some chosen operating frequency. To realize this with the simple resistance-capacitance circuit, the ratio of resistance to the reactance of the capacitor would have to be about 1150 to 1 with the result that the output voltage would be only 0.087% of the input voltage, assuming the capacitor to be loss free. In practice, however, the capacitor is never loss free so in order to satisfy the stated requirements, the ratio of resistance to the reactance of the capacitor would have to be even greater than 1150 to 1 and the signal loss would be even greater. If the inherent phase defect angle of the capacitor is three minutes or more, the circuit could never meet the stated requirements.

It is therefore an object of this invention to provide an improved electrical network for integrating and phase shifting electrical signals.

It is also an object of this invention to provide a simple electrical network providing an output signal that is in exact quadrature with the input signal and wherein the output signal is substantially greater than that obtainable with a simple series resistance-capacitance integrating network.

Briefly stated, I provide a compensated electrical integrating and phase shifting network comprising a first impedance element, input voltage means connected to the first impedance means, providing a voltage thereacross having a reactive component and a positive real component, and second impedance means connected to the first impedance means providing a negative real component of voltage across the first impedance means that is substantially equal to the positive real component of voltage.

In accordance with one aspect of my invention, I provide an electrical network comprised of a pair of series resistance-capacitance integrating networks connected in parallel, and having a resistance connected between the junctions of the resistances and capacitances in two series networks. The input voltage is applied across the parallel combination, and the output voltage is obtained across one of the capacitors. By proper selection of the values of the various components the output voltage may be in exact quadrature with the input voltage at a predetermined frequency.

In a modification of my invention, I provide a pair of series resistance-inductance networks connected in parallel, with an inductance connected between the junctions of the elements of the series networks. The input voltage is applied across the parallel combination, and the output voltage is obtained across one of the resistors.

My invention will be better understood from the following description taken in connection with the accompanying drawing and its scope will be pointed out in the appended claims.

Figure 3:
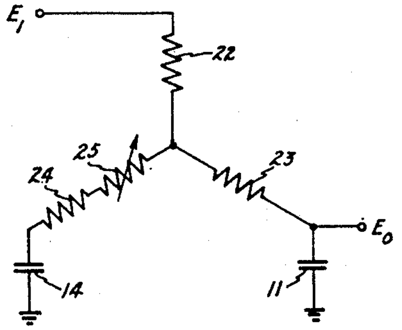
Figure 2:
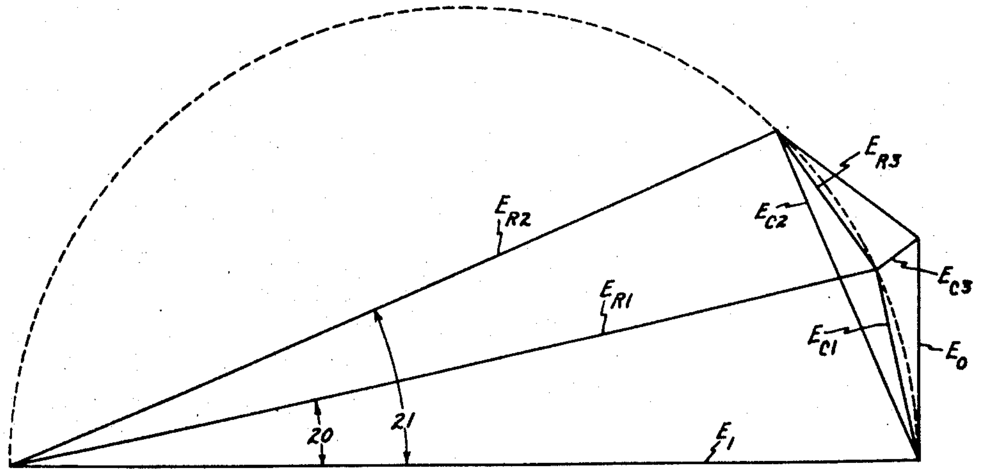
Figure 4:
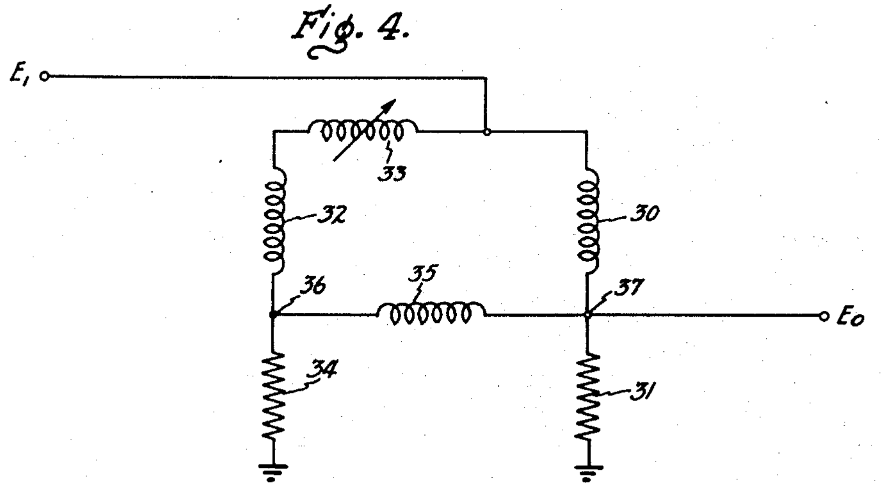
Figure 5:
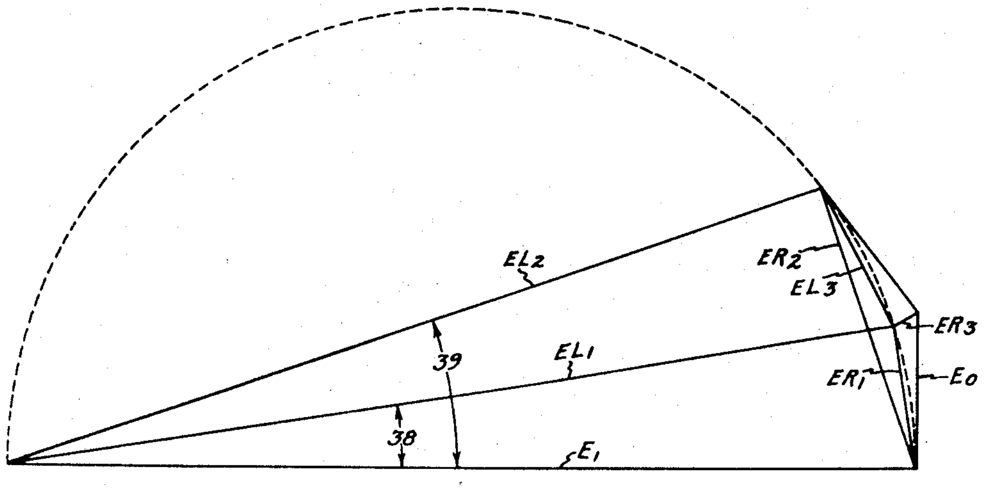

In the drawing:

Fig. 1 is a circuit diagram of one embodiment of the electrical integrating and phase shifting network of my invention, Fig. 2 is an exaggerated vector diagram illustrating the relative phase angles and amplitudes of voltages of the circuit of Fig. 1, Fig. 3 is a circuit diagram of a modification of the circuit of Fig. 1, Fig. 4 is a circuit diagram of another modification of my invention, and Fig. 5 is an exaggerated vector diagram illustrating the relative phase angles and amplitudes of the circuit of Fig. 4.

Referring now to Fig. 1, therein is illustrated a circuit comprised of a first resistor 10 in series with a first capacitor 11. A second series circuit comprised of a second resistor 12, an adjustable resistor 13, and a second capacitor 14 is connected in parallel with the first series combination of a resistor 10 and capacitor 11. A third resistor 15 is connected between the junction 16 of the second resistor 12 and the second capacitor 14, and the junction 17 of the first capacitor 10 and the first capacitor 11. The capacitors 11 and 14 are shown connected to a reference ground, and an input signal $E_1$ is applied across the parallel combination. The output voltage $E_0$ of the network is taken across the first capacitor 11.

The circuit may be better explained by reference to the exaggerated vector diagram of Fig. 2, in this figure the vector $E_1$ represents the input voltage to the circuit of my invention. The vector $E_{R1}$ represents the voltage across the first resistor 10 and has a phase angle 20 leading the vector $E_1$. The vector $E_{C1}$ represents the voltage across the first capacitor 11 due to current flowing through the first capacitor and first resistor 10, and is substantially in quadrature with the vector $E_{R1}$. The vector $E_{R2}$ represents the voltage across the second resistor 12 (neglecting for the moment the resistance of potentiometer 13) and has a phase angle 21 leading the vector $E_1$. The vector $E_{C2}$ represents the voltage across the second capacitor 14 and is substantially in quadrature with the vector $E_{R2}$. It is noted that the phase angle 21 of the voltage across the second resistor 12 is greater than the phase angle 20 of the voltage across the first resistor 10. In order to achieve this the ratio of resistance of the first resistor 10 to the reactance of the first capacitor 11 is greater than the ratio of the resistance of the second resistor 12 to the reactance of a second capacitor 14.

Referring still to Fig. 2 the vector $E_{R3}$ represents the voltage across the resistor 15, since the voltage across the third resistor is the vector difference in voltages across the two capacitors. Since the voltage across second capacitor 14 is different from the voltage across first capacitor 11, a current flows through the mesh comprised of first capacitor 11, third resistor 15, and second capacitor 14. This current produces a voltage represented by the vector $E_{C3}$ across the first capacitor 11 and is substantially in quadrature with the vector $E_{R3}$. The output voltage across the first capacitor 11 is represented by the vector $E_0$, and is the sum of the vectors $E_{C1}$ and $E_{C3}$. Upon proper selection of the circuit components, the vector $E_0$ will be in quadrature with the input voltage vector $E_1$ for a predetermined frequency.

Stated in another manner, if the third resistor 15 is open, a voltage appears across the first capacitor 11 that lags the input voltage by almost 90° but has a small positive real component. Similarly a voltage appears across the second capacitor 14 that lags the input voltage by almost 90° but has a small positive real component. When the third resistor 15 is connected in the circuit, a current flows through this resistor due to the differences in voltage across the two capacitors, the current flowing in the mesh composed of the two capacitors 11 and 14 and the third resistor 15. A difference voltage, also being essentially a quadrature voltage relative to the input voltage, causes an additional real component of voltage to appear across the first capacitor 11. If this additional real component is negative and equal in magnitude to the existing positive real component, all real components of voltage disappear from the total voltage across the first capacitor 11, and the output voltage $E_0$ is pure quadrature voltage. The additional real component is readily made negative by causing the voltage drop across the second capacitor 14 to be greater than the voltage drop across the first capacitor 11. Slight variation in the output voltage phase angle may be made by such means as adjusting the value of adjustable resistor 13.

In the above explanation of the circuit of my invention, it has been assumed that the capacitors 11 and 14 were loss free. If the first capacitor 11 has some inherent loss, this loss will also cause a component of positive real voltage to appear in the drop across the first capacitor. Since it is possible to adjust the magnitude of that component of voltage drop across the first capacitor due to current through the third resistor 15, this adjustment may well be made to neutralize the real drop due to inherent loss in the first capacitor as well as the positive real component previously mentioned. It becomes practical, therefore, to use imperfect capacitors in the compensated integrator circuit of my invention and still obtain an exact quadrature relationship between the signal input voltage and the signal output voltage.

Although a pure quadrature voltage output can be obtained with my circuit at only one predetermined frequency, the circuit has a considerable compensating effect at other frequencies.

The transfer function of this circuit in terms of sinusoidal operation is:

$$\frac{E_0}{E_1}=\frac{R_1+R_2+R_3+jwC_2R_2R_3}{R_1+R_2+R_3-w^2C_1C_2R_1R_2R_3+jw[C_2R_2(R_1+R_3)+C_1R_1(R_2+R_3)]}$$

where $E_0$ is the output voltage, $E_1$ is the input voltage, $R_1$ is the resistance of the first resistor 10, $R_2$ is the resistance of the second resistor 12 plus that of adjustable resistor 13, $R_3$ is the resistance of the third resistor 15, $C_1$ is the capacitance of the first capacitor 11, and $C_2$ is the capacitance of the second capacitor 14. If all the resistances have equal values and the capacitors are loss free, the output voltage $E_0$ is in exact quadrature with the input voltage $E_1$ when:

$$C_2=\frac{C_1}{4}\left[1\pm\sqrt{1-72\left(\frac{f_0}{f}\right)^2}\right]$$

where $f_0$ is the frequency at which the reactance of the first capacitor is equal to the resistance of the first resistor and $f$ is the frequency at which the exact quadrature is obtained.

Contrasting the performance of this circuit with that of the simple series resistor capacitor circuit, in the previously cited example (i. e. where it is required to integrate an electrical signal and at the same time provide a 90° phase shift with an error not to exceed three minutes at a chosen frequency), the desired results may be achieved with my circuit with a ratio of resistance of the first resistor to reactance of the first capacitor as low as 20:1, even though the capacitor may have a residual defect angle greater than three minutes. In this case the output voltage will be about 5% of the input voltage, an increase of over 50 times that obtained with the simple series integrator.

Another feature of the circuit of my invention is that small compensations may readily be made by such means as adjusting the adjustable resistor 13 to provide either under compensated or over compensated output voltage phase angles. This is useful where a small amount of phase compensation (up to about ±1°) is needed to neutralize phase angle errors in associated circuitry such as amplifiers.

It will be obvious to those skilled in the art that various modifications may be made in the circuit of this invention. Thus in the circuit of Fig. 3, the delta connected resistors 10, 12—13 and 15 of Fig. 1 have been replaced by an equivalent Y circuit comprised of resistors 22, 23, and 24 and variable resistor 25 in series with resistor 24. The electrical equivalence of the circuit of Fig. 1 and the circuit of Fig. 3 is obvious.

Another modification of my invention, in this case employing resistance-inductance networks, is illustrated in Fig. 4, wherein is illustrated a circuit comprised of a first inductor 30 serially connected with a first resistor 31. A second series circuit is provided comprised of a second inductor 32, and adjustable inductor 33, and a second resistor 34. The second series circuit is connected in parallel with the first series circuit, and an input signal $E_1$ is applied across the parallel combination of the series circuits. A third inductor 35 is connected between the junction 36 of inductor 32 and resistor 34 and the junction 37 between the inductor 30 and the resistor 31. The adjustable inductor 33 is on the same side of the junction 36 as the second inductor 32. The output voltage $E_0$ of the network is obtained across the first resistor 31.

Referring now to Fig. 5, wherein is illustrated an exaggerated vector diagram of the circuit of Fig. 4, the reference vector $E_1$ represents the input signal voltage. The vector $E_{L1}$ represents the voltage across the first inductor 30 and is substantially in quadrature with the vector $E_{R1}$ representing the voltage across the first resistor 31 resulting from current flow through the series circuit comprised of inductor 30 and resistor 31. Similarly, the vector $E_{L2}$ represents the sum of the voltage across the second inductor 32 and adjustable inductor 33, and this vector is substantially in quadrature with the vector $E_{R2}$ representing the voltage drop across the second resistor 34. The phase angle 38 between the vectors $E_{L1}$ and $E_1$ is less than the phase angle 39 between the vectors $E_{L2}$ and $E_1$. This relationship of phase angles may be obtained by adjusting the circuit components so that the ratio of reactance of the first inductor 30 to the resistance of the first resistor 31 is greater than the ratio of reactance of the second inductor 32 and adjustable inductor 33 to the resistance of the second resistor 34. The vector $E_{L3}$ represents the voltage appearing across the third inductor 35 as a result of the potential difference between the points 36 and 37, and the resultant current flowing through the third inductor 35 creates a component of voltage $E_{R3}$ substantially in quadrature with the vector $E_{L3}$ to appear across the first resistor 31. Therefore, the output voltage $E_0$ is the vector sum of the voltages $E_{R1}$ and $E_{R3}$ appearing across the first resistor 31.

A substantially exact quadrature relationship between the output voltage $E_0$ and the input signal voltage $E_1$ may be obtained by variation of the adjustable inductor 33, or as an alternative, by variation of the resistor 34.

It will be understood, of course, that, while the forms of the invention herein shown and described constitute preferred embodiments of the invention, it is not intended herein to illustrate all of the possible equivalent forms or ramifications thereof. It will also be understood that the words used are words of description rather than of limitation, and that various changes may be made without departing from the spirit or scope of the invention herein disclosed.

What I claim as new and desire to secure by Letters Patent of the United States is:

1. A compensated electrical integrating and phase shifting network comprising first and second series combinations of first and second reactive elements of the same type respectively and first and second resistive elements respectively, said series combination being connected in parallel with one end of each of said reactive elements connected together, input voltage means connected across the parallel connected combinations, output circuit means connected across the one element of said first series combination having a lagging voltage with respect to the voltage of the other element of said first series combination, and an impedance element of the same type as said other element connected between the other ends of said reactive elements.

2. A compensated electrical integrating and phase shifting network comprising first and second series combinations of first and second reactive elements of the same type respectively and first and second resistive elements respectively, said series combination being connected in parallel with one end of each of said reactive elements connected together, input voltage means connected across the parallel connected combinations, output circuit means connected across the one element of said first series combination having a lagging voltage with respect to the voltage of the other element of said first series combination, and an impedance element of the same type as said other element connected between the other ends of said reactive elements, the ratio of impedance of said other element to the impedance of said one element being greater than the ratio of impedance of the respective elements of said second series combination.

3. An electrical integrating and phase shifting network comprising a first series combination of a first resistor and a first capacitor in parallel with a second series combination of a second resistor and a second capacitor, one end of each of said capacitors being connected together, and a third resistor connected between the other ends of said capacitors, the ratio of resistance of said first resistor to the reactance of said first capacitor being greater than the ratio of resistance of said second resistor to the reactance of said second capacitor.

4. An electrical integrating and phase shifting network comprising a first series combination of a first resistor and a first capacitor in parallel with a second series combination of a second resistor and a second capacitor, one end of each of said capacitors being connected together, a third resistor connected between the other ends of said capacitors, the ratio of resistance of said first resistor to the reactance of said first capacitor being greater than the ratio of resistance of said second resistor to the reactance of said second capacitor, an input circuit connected across said parallel circuit, and an output circuit conected across said first capacitor.

5. An electrical integrating and phase shifting network comprising first, second, and third delta connected resistors, one terminal of a first capacitor connected to the junction between said first and second resistors, one terminal of a second capacitor connected to the junction between said second and third resistors, an input circuit connected between the junction of said first and third resistors and the other terminals of said capacitors, and an output circuit connected across said first capacitor, the ratio of resistance of said first resistor to the reactance of said first capacitor being greater than the ratio of resistance of said third resistor to the reactance of said second capacitor.

6. An electrical integrating and phase shifting network comprising a first series combination of a first resistor and a first inductor in parallel with a second series combination of a second resistor and a second inductor, one end of said inductors being connected together, and a third inductor connected between the other ends of said inductors, the ratio of reactance of said first inductor to the resistance of said first resistor being greater than the ratio of reactance of said second inductor to the resistance of said second resistor.

7. An electrical integrating and phase shifting network comprising a first series combination of a first resistor and a first inductor in parallel with a second series combination of a second resistor and a second inductor, one end of said inductors being connected together, and a third inductor connected between the other ends of said inductors, the ratio of reactance of said first inductor to the resistance of said first resistor being greater than the ratio of reactance of said second inductor to the resistance of said second resistor, an input circuit connected across said parallel circuit, and an output circuit connected across said first resistor.

8. An electrical integrating and phase shifting network comprising first, second, and third delta connected inductors, one terminal of a first resistor connected to the junction between said first and second inductors, one terminal of a second resistor connected to the junction between said second and third inductors, an input circuit connected between the junction of said first and third inductors and the other terminals of said resistors, and an output circuit connected across said first resistor, the ratio of reactance of said first inductor to the resistance of said first resistor being greater than the ratio of reactance of said second inductor to the resistance of said second resistor.

9. A compensated electrical integrating and phase shifting network comprising first and second combinations of first and second reactive elements of the same type connected in series with first and second resistive means respectively, said series combinations being connected in parallel, input voltage means connected to said parallel connected combinations, output circuit means connected across the one element of said first series combination having a lagging voltage with respect to the voltage of the other element, and an impedance of the same type as said other element connected to said series connected combinations so that at least a portion of the current flowing through said impedance means also flows through at least a portion of each of said series combinations.

10. A compensated electrical integrating and phase shifting network comprising first and second combinations of first and second reactive elements of the same type connected in series with first and second resistive means respectively, said series combinations being connected in parallel, input voltage means connected to said parallel connected combinations, output circuit means connected across the one element of said first series combination having a lagging voltage with respect to the voltage of the other element, and an impedance of the same type as said other element connected to said series connected combinations so that at least a portion of the current flowing through said impedance means also flows through at least a portion of each of said series combinations, the ratio of impedance of said other element to the impedance of said one element being greater than the ratio of impedance of the respective elements of said second series combination.

11. A compensated electrical integrating and phase shifting network comprising first and second series connected resistance and reactance circuits connected in parallel, the reactances of the series connected circuits being of the same type, input voltage means connected to said parallel connected circuits, output circuit means connected across one element of said first series connected circuit having a lagging voltage with respect to the voltage of the other element in the same series connected circuit, and impedance means connected to each of said series connected circuits and having a common current component with at least a portion of each series connected circuit.

12. The network of claim 11 in which the ratio of impedance of said other element to the impedance of said one element in said first series circuit circuit is greater than the ratio of the respective elements of said second series circuit.

References Cited in the file of this patent

UNITED STATES PATENTS

| | | |
|---|---|---|
| 1,717,400 | Nyquist | June 18, 1929 |
| 2,524,759 | Brown | Oct. 10, 1950 |
| 2,758,274 | Clark et al. | Aug. 7, 1956 |